United States Patent
Tran

(10) Patent No.: US 10,434,712 B1
(45) Date of Patent: Oct. 8, 2019

(54) MODULAR AUTOMATED ADDITIVE MANUFACTURING SYSTEM

(71) Applicant: Andy Thien Tran, Orlando, FL (US)

(72) Inventor: Andy Thien Tran, Orlando, FL (US)

( * ) Notice: Subject to any disclaimer, the term of this patent is extended or adjusted under 35 U.S.C. 154(b) by 152 days.

(21) Appl. No.: 15/219,931

(22) Filed: Jul. 26, 2016

Related U.S. Application Data

(60) Provisional application No. 62/197,081, filed on Jul. 26, 2015.

(51) Int. Cl.
*B29C 64/209* (2017.01)
*B29C 64/232* (2017.01)
*B29C 64/236* (2017.01)
*B65D 88/12* (2006.01)
*B33Y 30/00* (2015.01)
*B33Y 40/00* (2015.01)

(52) U.S. Cl.
CPC .......... *B29C 64/236* (2017.08); *B29C 64/209* (2017.08); *B29C 64/232* (2017.08); *B33Y 30/00* (2014.12); *B33Y 40/00* (2014.12); *B65D 88/121* (2013.01)

(58) Field of Classification Search
CPC ..... B29C 64/20; B29C 64/205; B29C 64/209; B29C 64/227; B29C 64/232; B29C 64/236; B29C 64/30; B29C 64/379; B33Y 30/00; B33Y 40/00
See application file for complete search history.

(56) References Cited

U.S. PATENT DOCUMENTS

| | | | |
|---|---|---|---|
| 4,431,902 A | 2/1984 | Wallen | |
| 5,383,698 A | 1/1995 | Buchholz | |
| 5,493,817 A | 2/1996 | Speer | |
| 6,305,769 B1 * | 10/2001 | Thayer | B29C 67/0059 347/1 |
| 7,114,754 B2 | 10/2006 | Morello | |
| 2007/0062383 A1 * | 3/2007 | Gazeau | B41J 3/4073 101/35 |
| 2011/0011222 A1 | 1/2011 | Bales | |
| 2013/0242317 A1 * | 9/2013 | Leavitt | B29C 67/0055 358/1.8 |
| 2014/0008359 A1 * | 1/2014 | Ferren | B65D 88/121 220/1.5 |
| 2014/0081428 A1 * | 3/2014 | Rudberg | G05B 19/02 700/66 |

(Continued)

FOREIGN PATENT DOCUMENTS

WO WO2006/116819 11/2006

*Primary Examiner* — Michael Safavi
(74) *Attorney, Agent, or Firm* — Livingston Loeffler, P.A.; Edward M. Livingston, Esq.; Bryan L. Loeffler, Esq.

(57) ABSTRACT

A modular automated additive manufacturing system of the present invention is preferably made up of one or more optional accessories including but not limited to additive manufacturing, 3D printing, Fused Filament Fabrication (FFF), subtractive manufacturing, material handler, material dispenser, 3d scanner, power generation system, engraving, laser, material spray and the like integrated into a shipping container for purposes of additive manufacturing and or digital fabrication.

The system of the present invention preferably includes a linear motion body with modular attachment head and other accessories mounted within a shipping container or other housing for the purposes of digital fabrication.

5 Claims, 11 Drawing Sheets

(56) References Cited

U.S. PATENT DOCUMENTS

| | | | | |
|---|---|---|---|---|
| 2014/0178588 A1* | 6/2014 | Swanson | ............. | B29C 67/0059 |
| | | | | 427/288 |
| 2014/0363327 A1* | 12/2014 | Holcomb | .............. | B22F 3/1017 |
| | | | | 419/53 |
| 2015/0028094 A1* | 1/2015 | Will | ....................... | B41M 5/382 |
| | | | | 235/3 |
| 2016/0144569 A1* | 5/2016 | Martin | ................ | B29C 67/0085 |
| | | | | 425/150 |
| 2016/0166011 A1* | 6/2016 | Bruce | ....................... | A43D 3/02 |
| | | | | 12/51 |
| 2016/0184893 A1* | 6/2016 | Dave | ...................... | B33Y 10/00 |
| | | | | 419/53 |
| 2016/0193854 A1* | 7/2016 | Moor | ..................... | B41J 11/002 |
| | | | | 347/9 |
| 2016/0332369 A1* | 11/2016 | Shah | ..................... | B33Y 10/00 |
| 2016/0335708 A1* | 11/2016 | Delvecchio | ......... | G06Q 30/0635 |
| 2017/0252967 A9* | 9/2017 | Guillemette | .......... | B29C 64/118 |
| 2017/0259507 A1* | 9/2017 | Hocker | ............... | B29C 67/0055 |

* cited by examiner

MODULAR AUTOMATED ADDITIVE MANUFACTURING SYSTEM

CROSS-REFERENCE TO RELATED APPLICATION

This application claims priority to provisional patent application No. 62/197,081 filed on Jul. 26, 2015. The provisional patent application identified is incorporated herein by reference in its entirety to provide continuity of disclosure.

FIELD OF THE INVENTION

This invention relates to devices for modular automated additive manufacturing and more particularly to a modular automated additive manufacturing system integrated into a shipping container or similar housing for the purposes of making the system mobile.

BACKGROUND OF THE INVENTION

Because of the cost, 3D printing at construction scales demands clever design and can respond to the demands of architects and engineers for high value, high performance building components. Potential advantages of these technologies include faster construction, lower labor costs, increased complexity and/or accuracy, greater integration of function and less waste produced.

Accordingly, it would be useful to provide a modular automated additive manufacturing system or device adapted to secure a wireless contact with its accessories at a distance from the user for off-site production. In addition, it is useful to provide a modular automated additive manufacturing system that allows the user to move the system around swiftly and not lose production capacity between the fabrication system and the user's location.

SUMMARY OF THE INVENTION

The modular automated additive manufacturing system of the present invention is preferably made up of one or more optional accessories including but not limited to additive manufacturing, 3D printing, Fused Filament Fabrication (FFF), subtractive manufacturing, material handler, material dispenser, 3D scanner, power generation system, engraving, laser, material spray and the like integrated into a shipping container for purposes of additive manufacturing and or digital fabrication.

The system of the present invention preferably includes a linear motion body with modular attachment head and other accessories mounted within a shipping container or other housing for the purposes of digital fabrication.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DETAILED DESCRIPTION OF THE INVENTION

Figure 1:
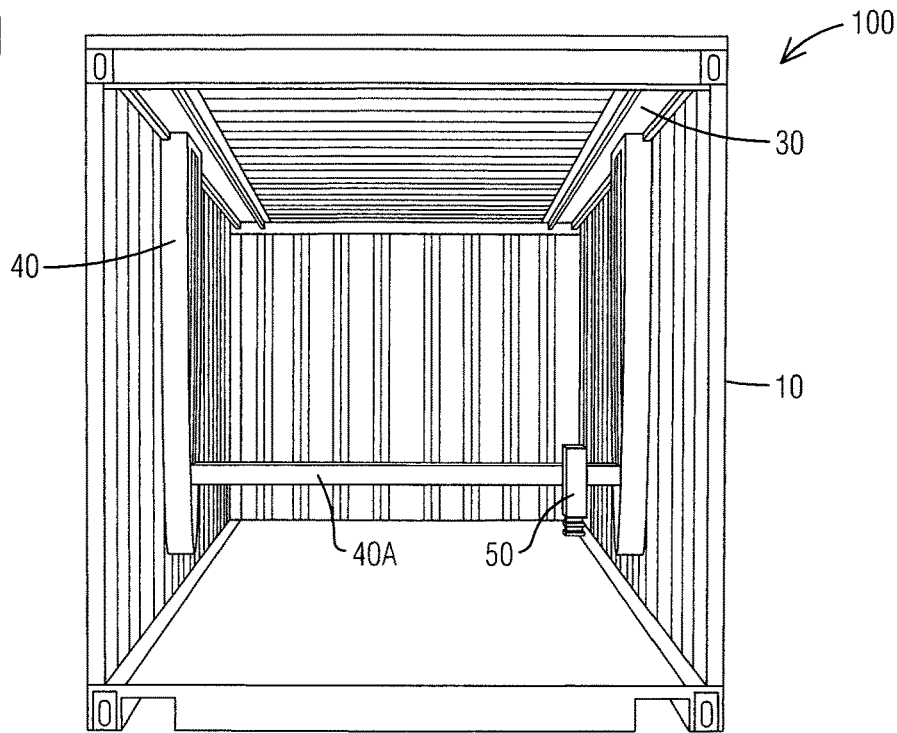
FIG. 1 depicts a front inside view of a first embodiment of a modular automated additive manufacturing system of the present invention.
Figure 2:
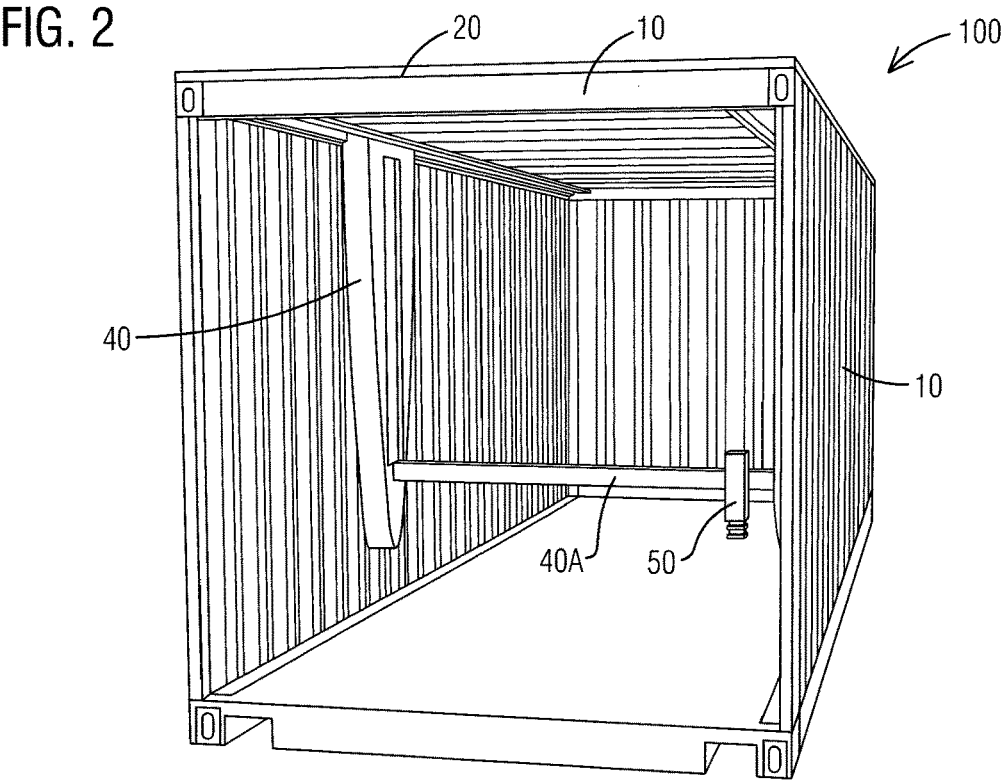
FIG. 2 depicts a perspective view of the first embodiment of a modular automated additive manufacturing system as shown in FIG. 1.

A modular automated additive manufacturing system 100 of the present invention may be configured in a wide variety of embodiments, wherein a first exemplary embodiment is illustrated in FIGS. 1-12 and a second embodiment is illustrated in FIGS. 12-17. Each modular automated additive manufacturing system 100 may comprise a variety of components that may be interchangeably used wherein individual components may be rearranged, added, or omitted from the device as desired. The variety of components as shown in FIGS. 1-22 may include but are not limited to a shipping container 10 or similar rectangular-shaped housing having a floor, a ceiling, at least three side walls creating an interior space and an opening for accessing said interior space. The shipping container 10 may house an onboard power system 20, material handler 30, linear motion body 40, horizontal motion arm 40A, magnetic attachment plate 40B, a modular attachment head 50 or other device provided by the user, one or more accessories, one or more rail systems 60, heavy duty linear motion body 40 and any other accessories known within the art.

The modular automated additive manufacturing system of the present invention allows 3D printing, FFF (Fused Filament Fabrication) extrusion, additive manufacturing, laser cutting, 3D scanning, digitization, any other media device or device mountable to a modular attachment to be mounted to an expandable, upgradable system which will improve the stability of additive manufacturing, digital fabrication and the like. The present system by means of its interchangeable components and one or more rail systems 60 provides for both expandability and customization for each specific user's needs and requirements. In this manner, the FFF extrusion head or other mounted device may be functional for a wider number of uses while having its utility further augmented by the attachment of additional accessories to the modular automated additive manufacturing system 100. The fabrication system 100 of the present invention provides a standard system that may be stacked successively on the body of the shipping container 10 thereby making it stable while still being very adaptable and maneuverable. This allows for increased production capacity in a dynamic environment while not sacrificing stability or production quality. The modular automated additive manufacturing system 100, with its variety of embodiments may be highly adaptable to a limitless number of environments including but not limited to professional settings, industrial, rural, use indoors, use outdoors, use in inclement weather such as rain and snow, remote locations, and the like.

The modular automated additive manufacturing system 100 may have a modular design (see FIGS. 3, 4, 7, 18) and be easy to store. For cleaning and/or storage the modular design of the fabrication system 100 allows each component the come apart easily for disassembly and/or replacement or repair. All points of connection or attachment within the modular automated additive manufacturing system 100 may be releasable in nature (or in a non-preferred embodiment one or more connection points may be fixed). Individual parts and components may be interchangeable in nature to allow for repair or upgrades as needed (while preferred models constructed of high impact resistant parts, such as with industrial grade components, minimize damage and/or the need for repairs). The modular automated additive manufacturing system 100 provides both a professional and a strong platfonn to the modular attachment head system of the user that may provide an increased confidence in a user of the modular automated additive manufacturing system 100 of the present invention. Even novices may enjoy using the fabrication system 100 of the present invention due to its modular design that is also versatile and easy to transport.

The beneficial uses of the present invention are limitless and include use as a modular attachment head 50 for additive manufacturing, use with laser cutting, laser engraving, use with 3D scanner that require precise tool movement and position acquisition, use and attachment to air tools, or other conventional tool systems, use as a training tool for the military applications, fabricators, and business owners, education systems and the like. The beneficial function of the modular automated additive manufacturing system 100 of the present invention provides for a device comprising the combination of rail system or rail systems with a standard slot mount. Numerous accessories and optional add-ons may be further installed onto the modular automated additive manufacturing system 100 as need and/or customized by each specific user.

The onboard power system 20 allows for stable means of operation and the like. A stable platform is provided by the modular automated additive manufacturing system 100 by the rigid construction transportable workstation with both the onboard power system 20 and the shipping container 10 form factor. The onboard power system 20 may also be configurable between passive and active positions, as shown in FIGS. 5, 6, 10 and 11. The onboard power system 20 may be attached to the wall surface of the shipping container 10 by a linear motion connection, or any other connection methods known within the art.

Figure 22:
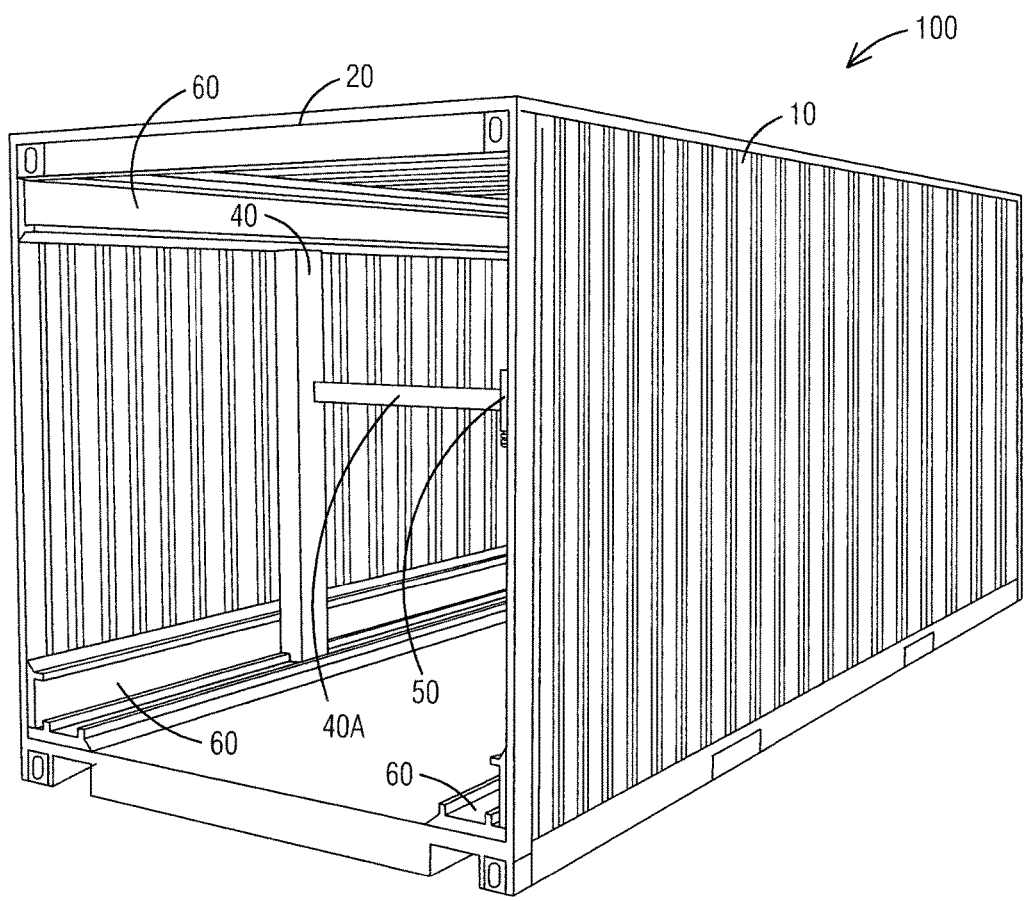
FIG. 22 depicts a front perspective view of a modular automated additive manufacturing system of the second embodiment of the present invention.

With reference to FIG. 22, the cargo, intermodal container and or shipping container 10 provides the core of the modular automated additive manufacturing system 100. As noted above, with certain embodiments the shipping container 10 may be configured in a unitary design with the fabrication system 100 wherein the shipping container 10 comprises of one or more rail systems 60 may also be attached to any surface of the shipping container 10.

FIG. 22 depicts rail systems 60 (such as linear or rod rails) along the side walls of the shipping container 10. In a preferred embodiment (see FIGS. 6, 9, 10), the material handler 30 may comprises magnetic cross section providing surfaces for mounting and connecting to other components and rail systems 60 of the present invention. The material handler 30 may be filled of a wide number of materials including but not limited to composites, metal, wood, paper, plastic or polymers, high impact resistant material, and any other materials known of the like.

In a preferred embodiment, both the top surface and bottom surface of the shipping container 10 have a linear motion system and/or rod rail system disposed thereon for providing a connection point with the other components of the modular automated additive manufacturing system 100. Such a preferred embodiment is not meant to be limiting in the scope of the present invention and any other types of known additive fabrication tools are all contemplated within the scope of this invention. From the perspective of the user, the shipping container 10 may be attached to the top surface of another shipping container 10 and the onboard power system 20 may be attached to any interior or exterior surface of the fabrication system 100.

Figure 6:
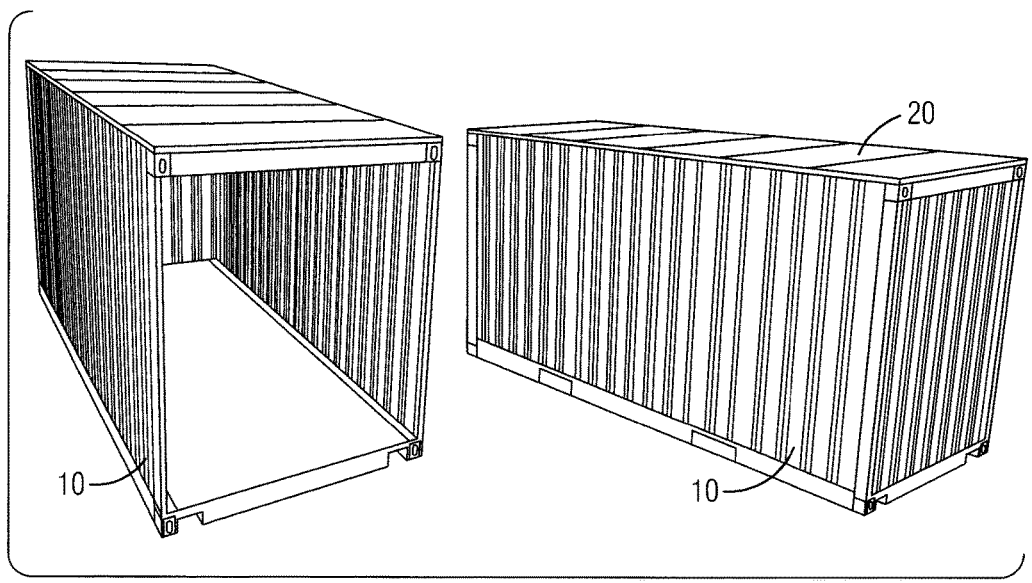
FIG. 6 depicts an alternate perspective view of the modified version of the first embodiment of a modular automated additive manufacturing system.
Figure 7:
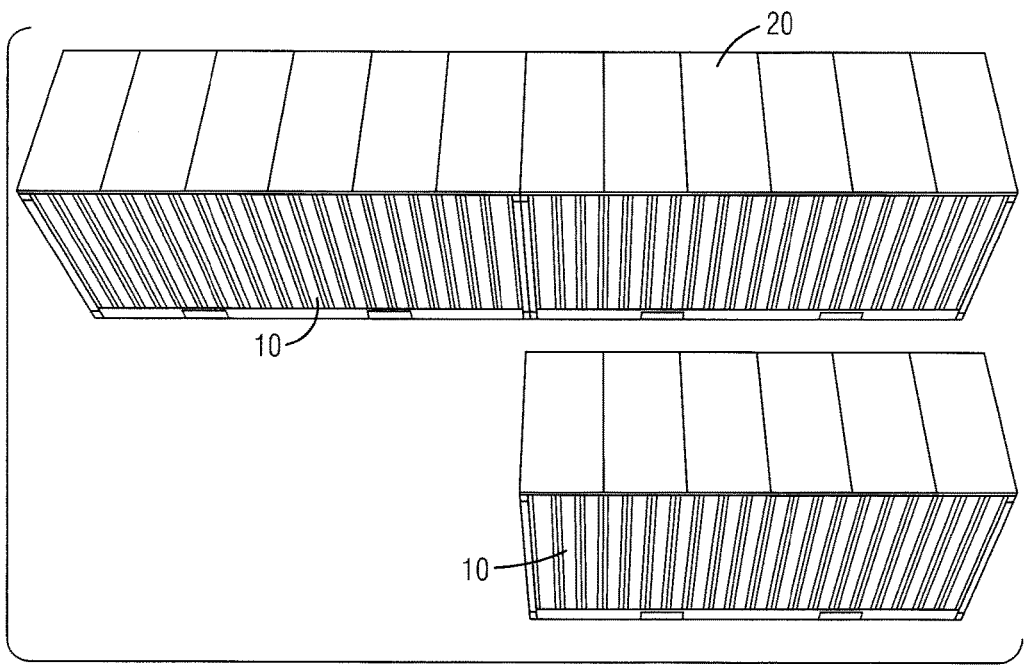
FIG. 7 depicts a top view of a disassembled kit of a first embodiment of a modular automated additive manufacturing system of the present invention.
Figure 8:
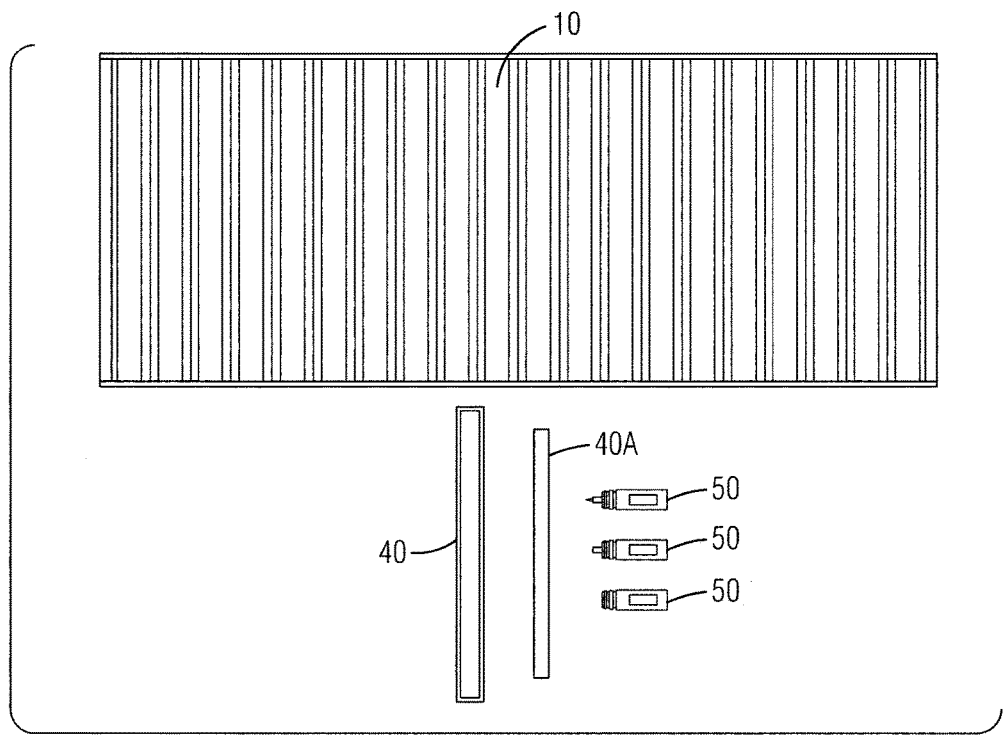
FIG. 8 depicts a front view of a modular automated additive manufacturing system s of the first embodiment of the present invention.
Figure 9:
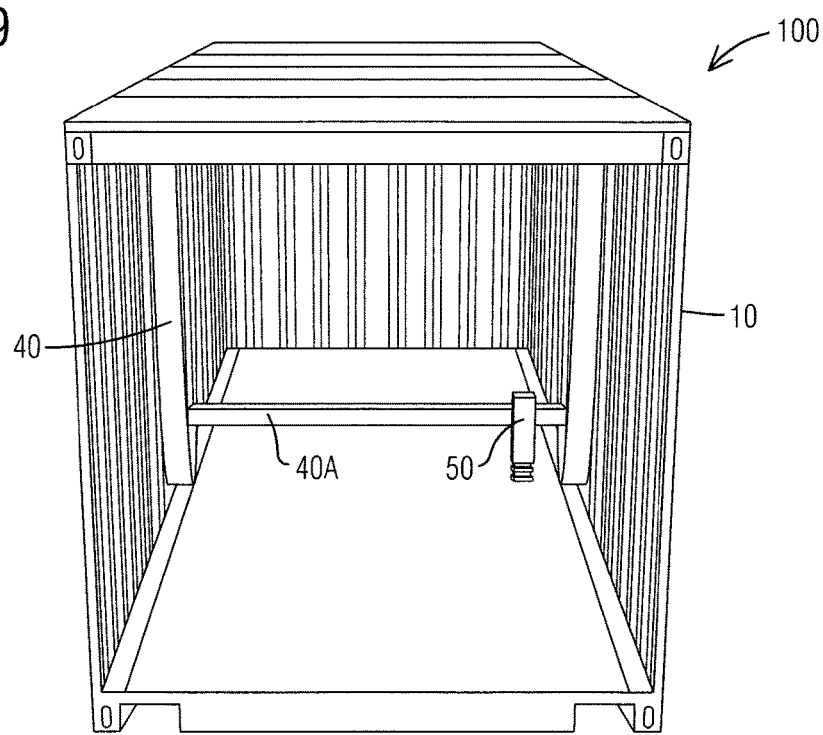
FIG. 9 depicts a side view of inside of the first embodiment of a modular automated additive manufacturing system of the present invention.
Figure 10:
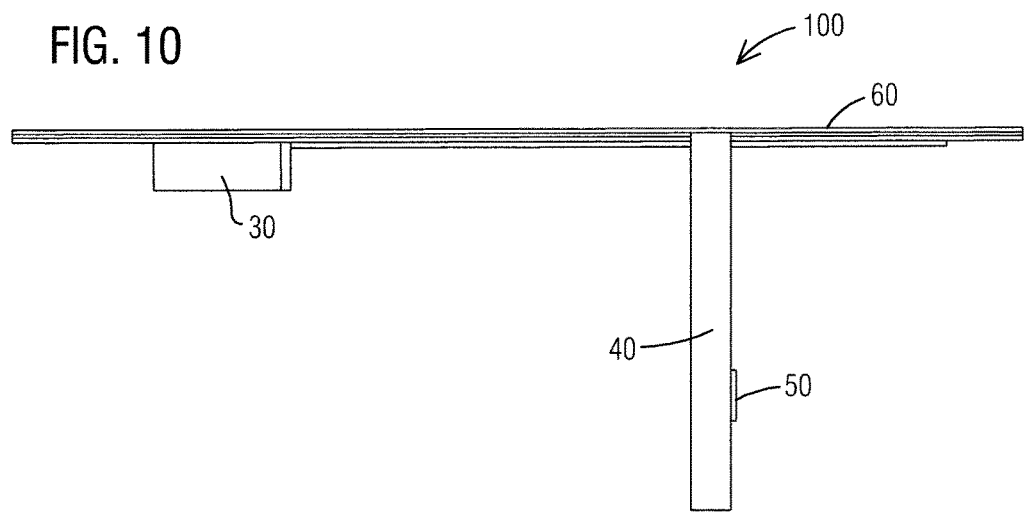
FIG. 10 depicts an alternate side view of the first embodiment of a modular automated additive manufacturing system of the present invention.
Figure 11:
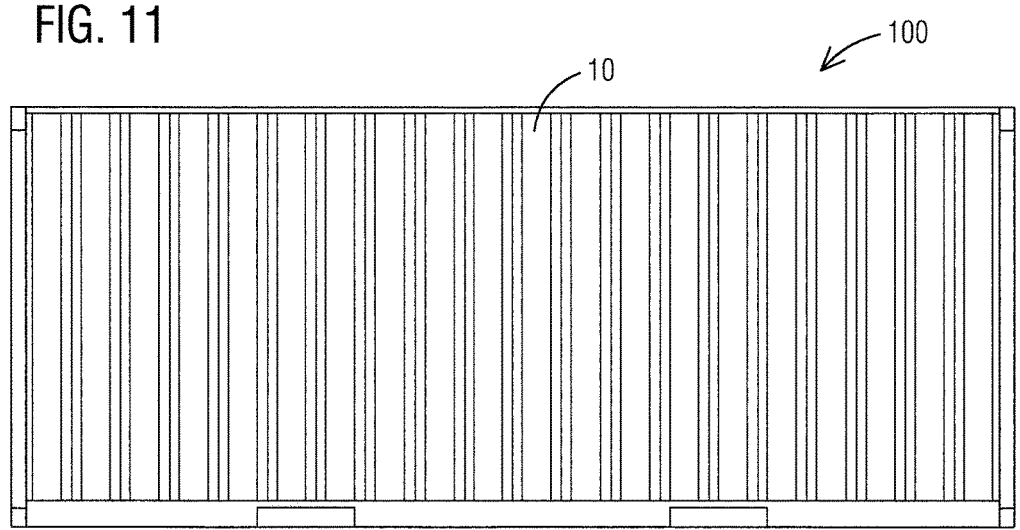
FIG. 11 depicts a rear view of a modular automated additive manufacturing system of the present invention.
Figure 12:
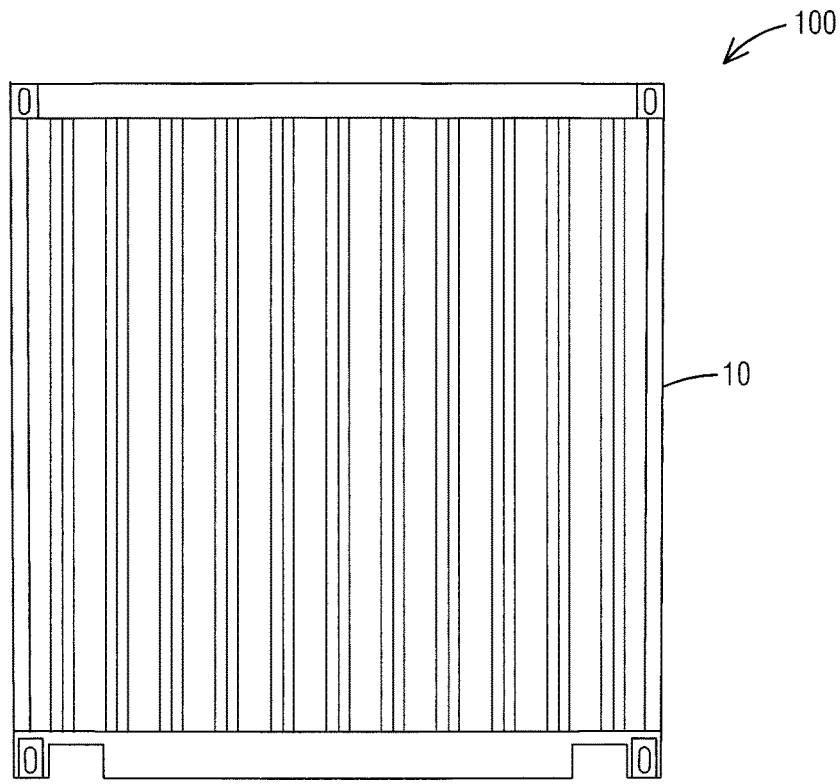
FIG. 12 depicts a magnified front perspective view of a modular automated additive manufacturing system of the second embodiment of the present invention.
Figure 13:
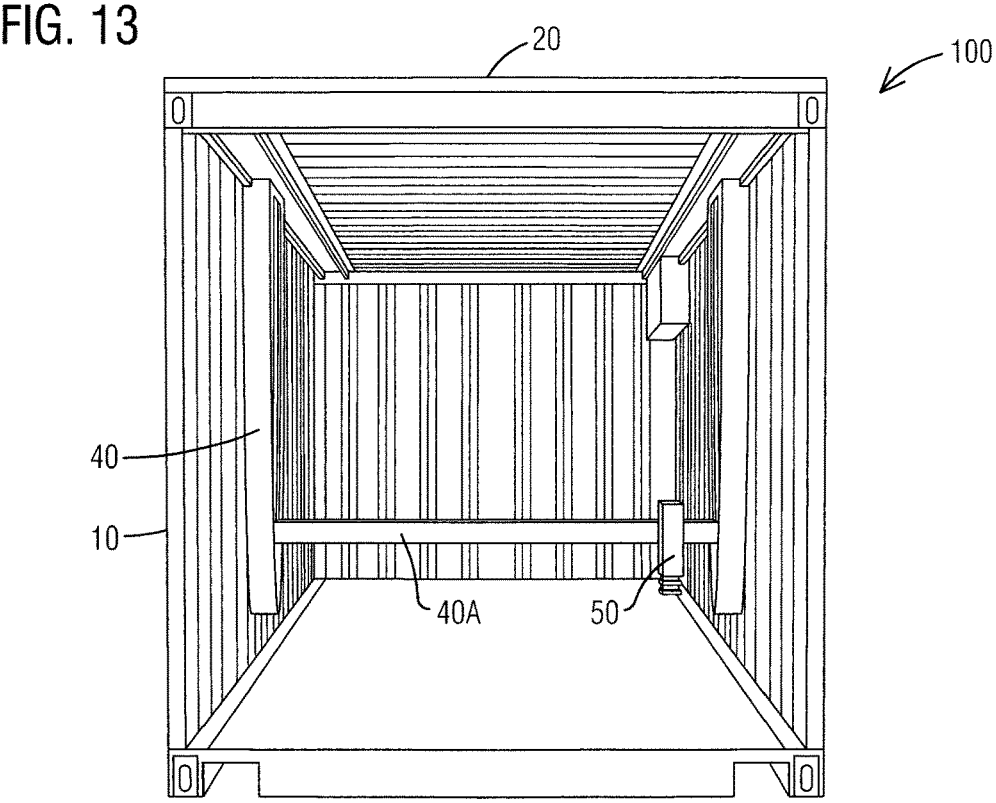
FIG. 13 depicts a front view of a modular automated additive manufacturing system of the second embodiment of the present invention.
Figure 14:
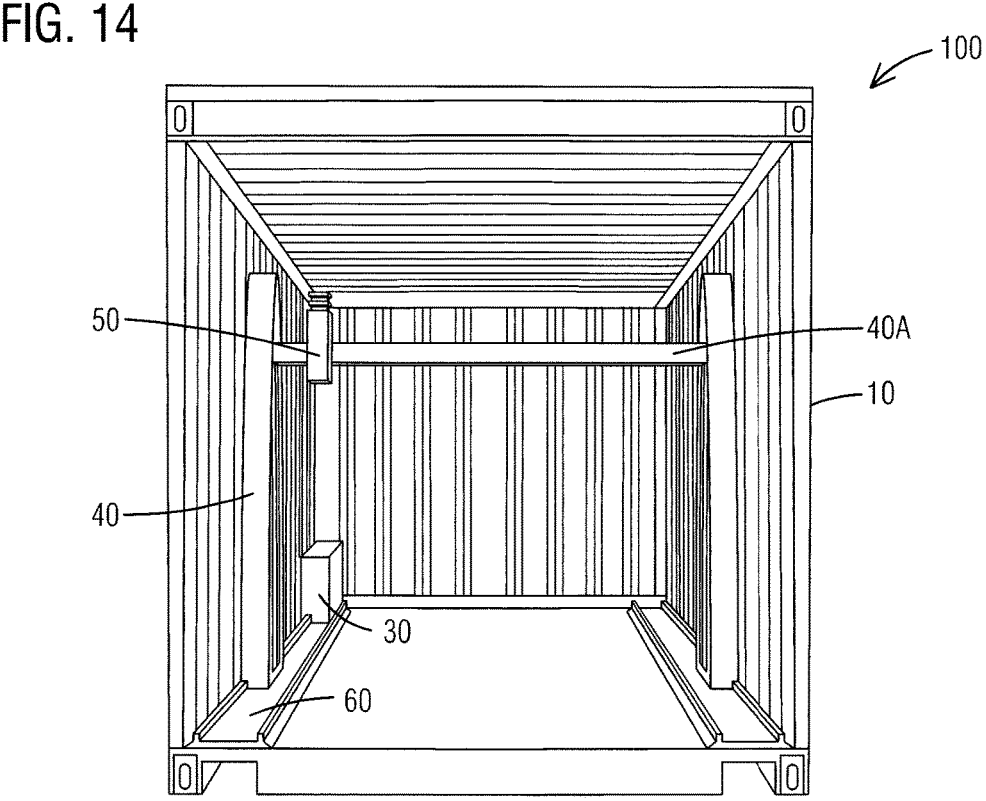
FIG. 14 depicts a perspective view of a modular automated additive manufacturing system of the second embodiment of the present invention without shipping container housing.
Figure 15:
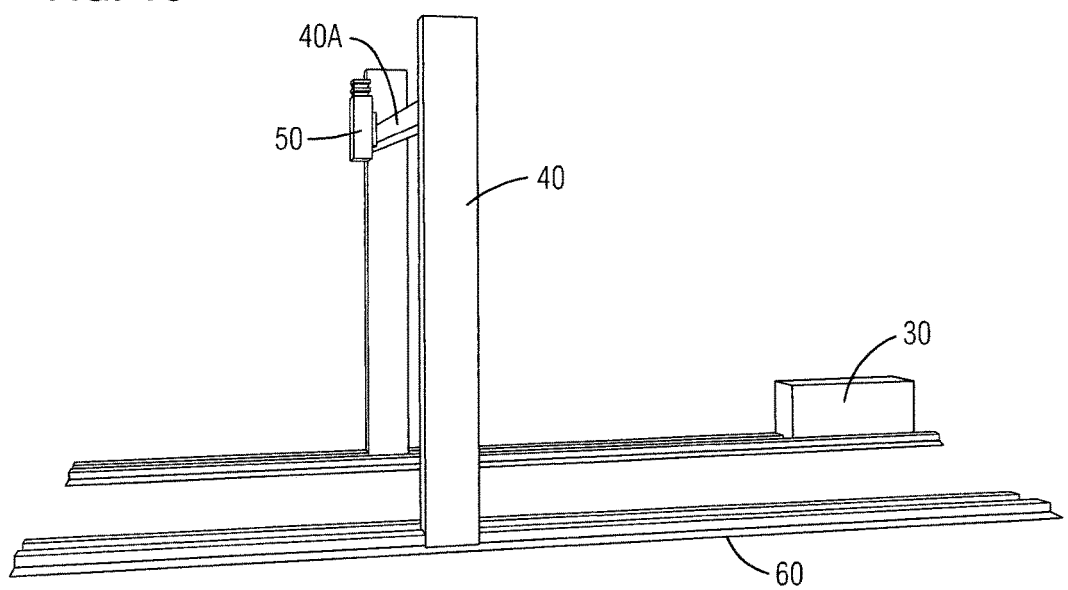
FIG. 15 depicts an alternate side view of a modular automated additive manufacturing system of the second embodiment of the present invention without shipping container housing.
Figure 16:
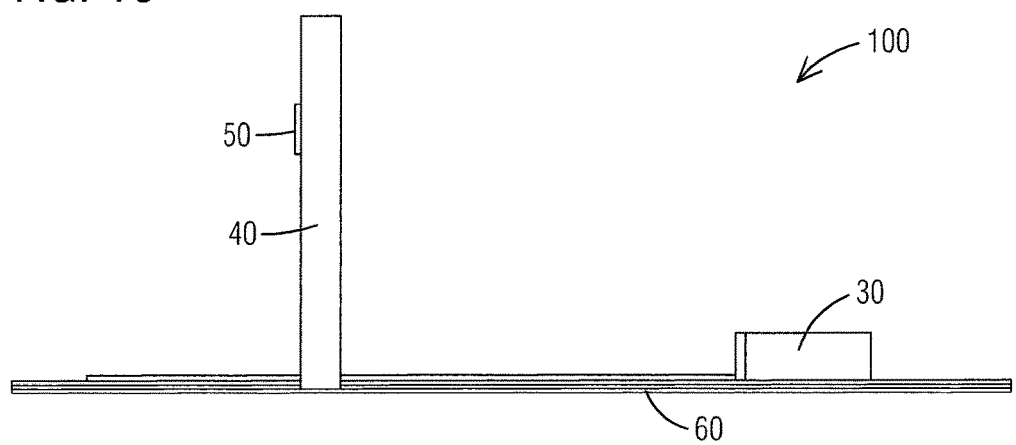
FIG. 16 depicts a top view of a portion of a modular automated additive manufacturing system of the second embodiment of the present invention.
Figure 19:
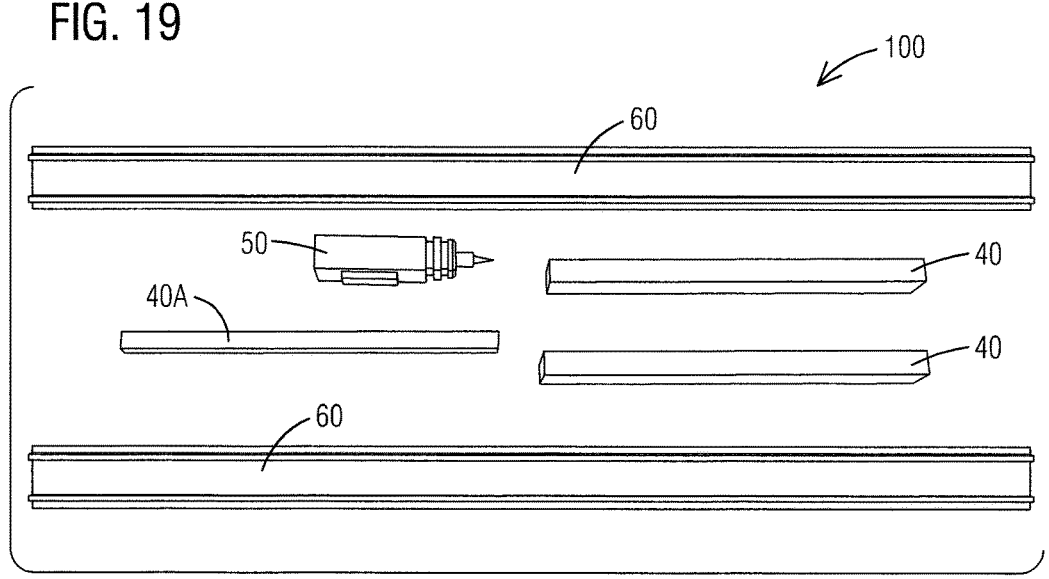
FIG. 19 depicts a low perspective view of the magnetic attachment of a modular automated additive manufacturing system of the first embodiment of the present invention.
Figure 20:
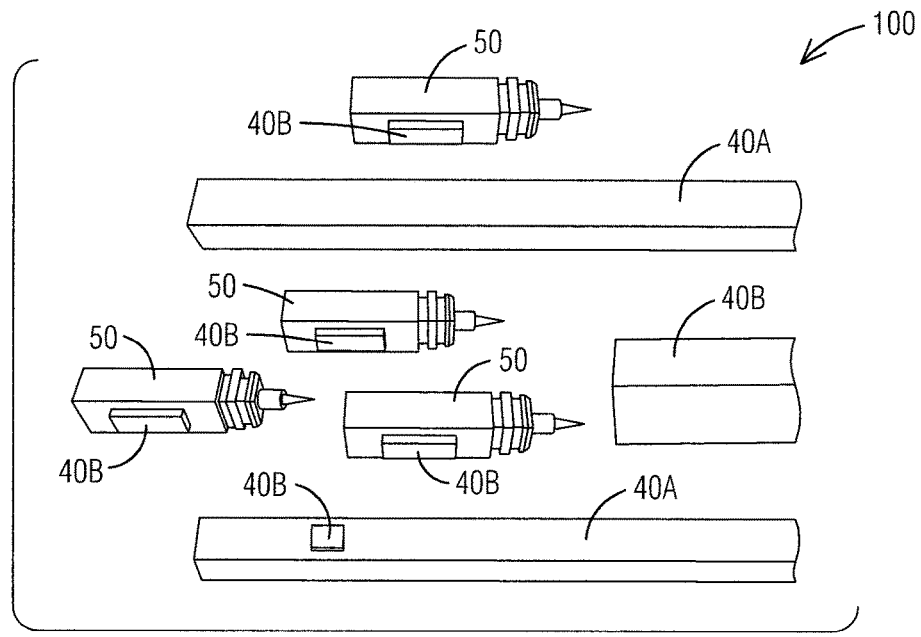
FIG. 20 depicts another low perspective view of the magnetic attachment of a disassembled kit with multiple modular attachment heads of a modular automated additive manufacturing system of the first embodiment of the present invention.

The linear motion body 40, as shown in FIGS. 1, 2, 8, 12 and 13, may attach to the lower surface of the shipping container 10. With reference to FIGS. 6, 9 and 10, the linear motion body 40 may comprise a magnetic male/female body for attaching the linear motion body 40 to the material handler 30. With reference to FIGS. 19-20, a magnetic attachment plate 40B for attaching the linear motion body 40a to the modular attachment head 50 or other device that may be provided by a user. In a preferred embodiment, the connection between the linear motion body 40 and shipping container 10 comprises a complimentary linear rail or rod rail system. Such a linear motion system attachment provides a quick-release type connection that allows for easy attachment of the linear motion body 40 to the shipping container 10.

Also in a preferred embodiment, the connection between the magnetic attachment plate 40B and the modular attachment head 50 or other device comprises any conventional tool attachment such as, for example, a threaded bolt ¼-20 to mount, articulated robotic arm, additional motorized axis, to any standard modular attachment head 50 or similar device having a firm surface. All other modular attachment head 50, 3D camera, and similar device connections including but not limited to male configurations, female configurations, differing sizes of components for various models or brands are also contemplated within the scope of the present invention. The magnetic attachment plate 40B may be constructed to be complimentary to any such modular attachment head 50 connections known within the art of additive manufacturing or automated digital fabrication.

Figure 3:
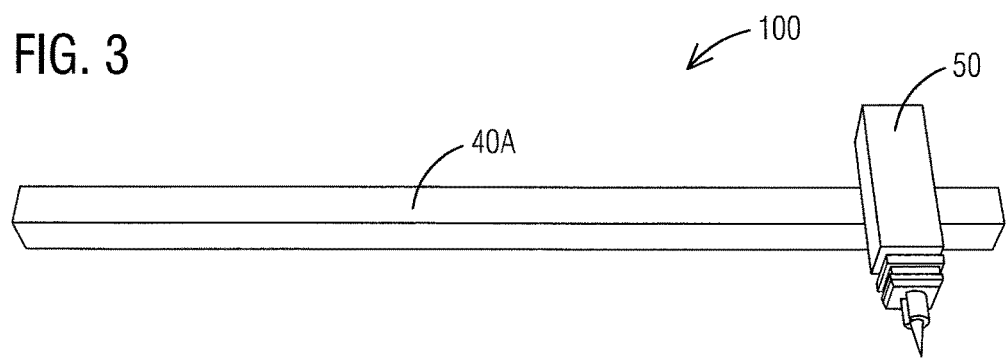
FIG. 3 depicts a perspective view of a portion of a disassembled kit of the first embodiment of a modular automated additive manufacturing system of the present invention.
Figure 4:
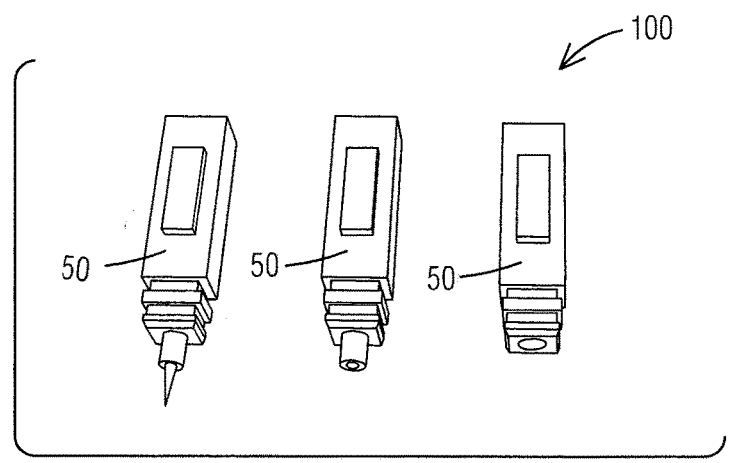
FIG. 4 depicts a perspective view of another portion of a disassembled kit of the first embodiment of a modular automated additive manufacturing system of the present invention.
Figure 5:
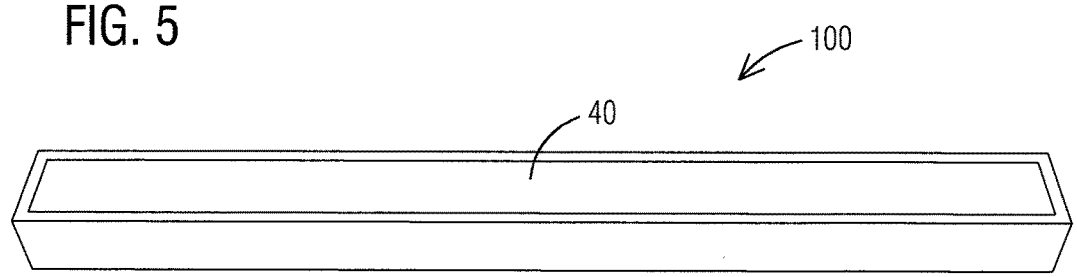
FIG. 5 depicts an alternate perspective view of the modified version of the first embodiment of a modular automated additive manufacturing system.
Figure 17:
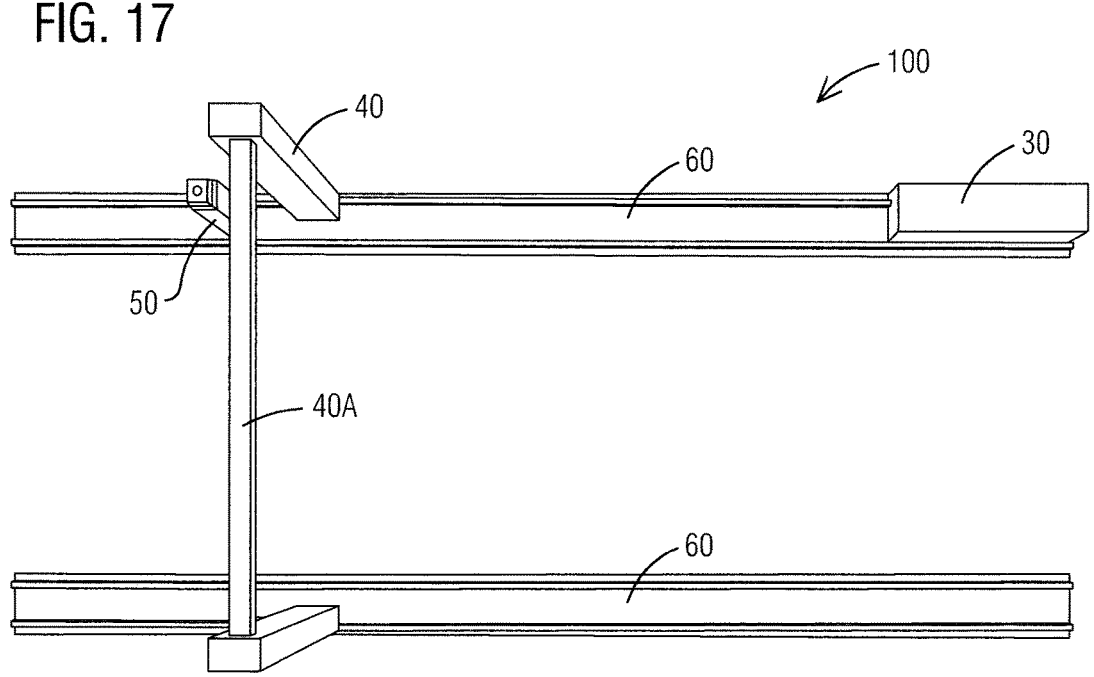
FIG. 17 depicts a side view of a portion of a plurality of a modular automated additive manufacturing system of the first embodiment of the present invention.
Figure 18:
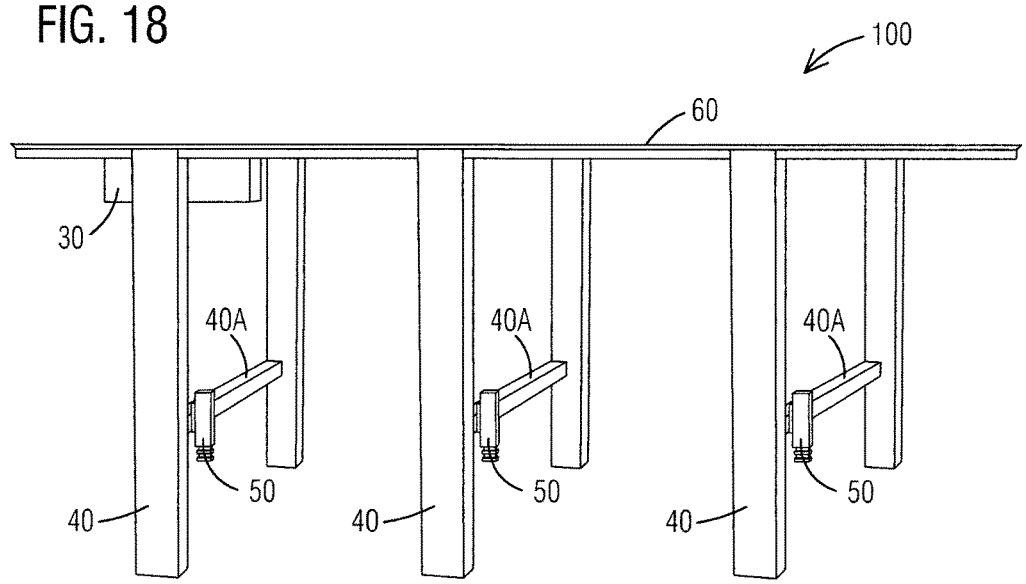
FIG. 18 depicts a perspective view of another disassembled kit of the first embodiment of a modular automated additive manufacturing system of the present invention.

With reference to FIG. 17, the linear motion body 40 component may also be used alone. As illustrated in FIG. 3, the linear or rod rail system attachment of the horizontal motion arm 40A allows for the linear motion body 40 and thereby the modular attachment head 50 to be attached to any device having a complementary linear or rail system structure. As illustrated in FIGS. 7, 10, 14, 15, 16 and 18, as one non-limiting example, the linear motion body 40 may be attached to a linear or rod rail system compatible for additive manufacturing and digital fabrication on any stable flat surface such as a floor, conveyor system, print bed, platfonn or table. The modular automated additive manufacturing system 100 of the present invention may further provide for releasable attachments for a plurality of attachments that may be simultaneously attached to the device 100 to create 3D footage or otherwise provide multiple operations simultaneously.

The upper surface of the linear motion body 40 and/or horizontal motion arm 40A may also comprise a linear or rod rail system attachment point. In this way other components, accessories, and the like may further be attached to the modular automated additive manufacturing system 100 of the present invention. As one example shown in FIG. 18, a rail system 60 may be attached to the upper surface of the linear motion body 40 and/or horizontal motion arm 40A. An rail system 60 provides the option of greater functionality to achieve extreme material handling such as laser sintering, metal extrusion, clay, sand, water jet, plasma, and or more easily lower the modular automated additive manufacturing system 100 closer to nano level. One or more rail systems 60 in alternate configurations and placements used alone or in any combination may allow a user to perform many more fabrication compositions compared to what would be possible without the fabrication system 100 of the present invention. The one or more 60 may be constructed from any material known within the art including but not limited to composites, metal, wood, plastic or polymer, high impact resistant material, glass, raw elements and the like.

LED lights are one exemplary accessory that a user may attach to a modular automated additive manufacturing system 100 of the present invention. Other accessories may include but are not limited to infrared, proximity sensors, light meters, air filtration systems, lasers, fans, heaters, coolers, vacuum pumps, computers, capacitors, wifi hotspot, speakers, bluetooth, wireless charging, usb, material sprays, and the like. These multiple accessories such as the LED lights may be attached to any connection surface of the modular automated additive manufacturing system 100 (the upper and/or lower surface of the shipping container 10 and the lower surface of the linear motion body 40 and/or horizontal motion arm 40A) or any additional rail systems 60 that may be disposed on other surfaces of the device 100 such as the side walls of the shipping container 10 (see FIGS. 1, 2, 5, 8, 12, 13). In a preferred embodiment, the one or more rail systems 60 are also a linear-type or rod-type for attachment of accessories that use the linear or rod rail mounting system.

Figure 21:
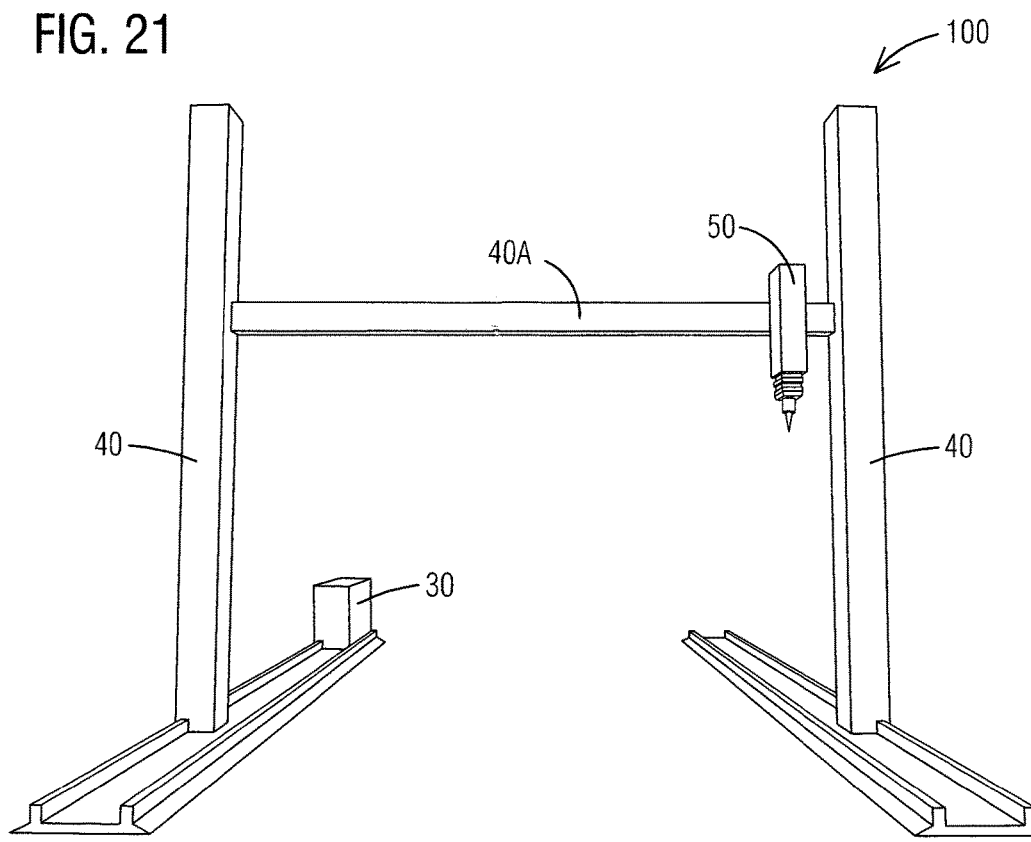
FIG. 21 depicts a magnified front perspective view of a modular automated additive manufacturing system of the second embodiment of the present invention without shipping container housing.

As shown in FIG. 21, an optional heavy duty linear motion body 40 may be provided with the fabrication system 100 of the present invention. The heavy duty linear motion body 40 may be used alone or in combination with the linear motion body 40 to assist in alleviating arm 40a from fatigue when a weighted modular attachment head 50 or extended production periods are required. The heavy duty linear motion body 40 may be attached to any component of the present inventive device 100 to allow additive manufacturing, digital fabrication, and the like in dual operation parallel mode, independent operation and or assist bearing the weight of a modular attachment head 50.

The modular automated additive manufacturing system 100 of the present invention incorporates elements of production capacity that allows for large format additive manufacturing 3D printing, and or digital fabrication while either moving or remaining static. An onboard power system 20 is positioned at the rear portion of the fabrication system 100 and may be connected to the main shipping container 10 via a mounting mechanism or may be integral with at least part of the shipping container 10 depending on the embodiment. The onboard power system 20 is located towards the upper portion of the shipping container 10 and can be swapped to different types of different sizes and shapes depending on the user's needs, in a preferred embodiment the onboard power system 20 is connected using a linear or rod rail system. A linear or rod rail system may also be used on the shipping container 10 to allow for great ease in accessorizing the shipping container 10 as needed. Each shipping container 10 may be upgraded and is capable of accepting various attachments to increase the functionality and style of the modular automated additive manufacturing system 100. The top surface of the shipping container 10 may comprise a linear or rod rail system to which photovoltaic cells, wind, capacitor, battery, and other renewable energy sources of the like of the onboard power system 20 can be attached. The photovoltaic cells may be moved either forward or backward along the top surface of the shipping container 10 depending on the user's preference and needs. The modular automated additive manufacturing system 100 of the present invention allows a user to perform many additive manufacturing and digital fabrication functions without sacrificing stability and performance. The modular automated additive manufacturing system 100 of the present invention enhances the ability, function, and dynamics of each modular attachment head 50 that is attached to the system 100 while further increasing its functionality and potential uses.

The modular automated additive manufacturing system 100 is a complete 3D printing manufacturing workstation that uses specialized software to link, operate and track operations, metrics and other value data of the like for the user. The system 100 can be linked wirelessly to fabricate new components from multiple units in different locations. Multiple modular attachment heads 50 can be operated. The system 100 can automatically detect failure and repair errors using specialized computerized algorithms and or by the known arts.

Applications for the modular automated additive manufacturing system 100 include but not limited to additive manufacturing, digital fabrication, 3D printing and the like with modular attachment heads 50 for the following example applications which may include aerospace, engineering, art works, sculptures, cross members, marine, automotive, education, architecture, prototyping, home construction, aquacultures, end use products, uav, robotics, prosthetics, science, reproduction of artifacts and other uses of the like which would not be possible without the standard modular automated additive manufacturing system 100.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A modular automated additive manufacturing system comprising:
   a rectangular-shaped shipping container having a floor, a ceiling and at least three side walls creating an interior space;
   an opening located on said shipping container for accessing said interior space;
   at least one rail system attached to an interior surface of the shipping container;
   a linear motion body located within the interior space of the housing and attached to the at least one rail system in a position that is perpendicular to the at least one linear rail;
   a horizontal motion arm located within the interior space of the housing and attached to the linear motion body in a position that is perpendicular to the linear motion body;
   said horizontal motion arm located within the interior space of the housing and attached to the linear motion body in a position that is perpendicular to the at least one linear rail;
   a modular attachment head located within the interior space of the housing and attached the horizontal motion arm; and
   a magnetic attachment plate located within the interior space of the housing.

2. The modular automated additive manufacturing system of claim 1 further comprising:
   an onboard power system located within the interior space of the housing.

3. A modular automated additive manufacturing system comprising:
   a rectangular-shaped shipping container having a floor, a ceiling and at least three side walls creating an interior space;
   an opening located on said shipping container for accessing said interior space;
   at least one rail system attached to an interior surface of the shipping container;
   a linear motion body located within the interior space of the housing and attached to the at least one rail system in a position that is perpendicular to the at least one linear rail;
   a horizontal motion arm located within the interior space of the housing and attached to the linear motion body in a position that is perpendicular to the linear motion body;
   said horizontal motion arm located within the interior space of the housing and attached to the linear motion body in a position that is perpendicular to the at least one linear rail;
   a magnetic attachment plate located within the interior space of the housing; and
   a modular attachment head located within the interior space of the housing and attached the horizontal motion arm.

4. The modular automated additive manufacturing system of claim 3 further comprising:
   an onboard power system located within the interior space of the housing.

5. The modular automated additive manufacturing system of claim 3 further comprising:
   a material handler located within the interior space of the housing.

* * * * *